April 3, 1951 W. BLESI 2,547,683
CENTERING GAUGE FOR ACCURATELY LOCATING A WORKPIECE
WITH RESPECT TO A KEYWAY CUTTER OR THE LIKE
Filed July 5, 1947

INVENTOR.
Walter Blesi
BY Edward T. Noe Jr.
atty.

Patented Apr. 3, 1951

2,547,683

UNITED STATES PATENT OFFICE 2,547,683

CENTERING GAUGE FOR ACCURATELY LOCATING A WORKPIECE WITH RESPECT TO A KEYWAY CUTTER OR THE LIKE

Walter Blesi, Dayton, Ohio, assignor to The Sheffield Corporation, Dayton, Ohio, a corporation of Ohio Application July 5, 1947, Serial No. 759,021

1 Claim. (Cl. 33—185)

This invention relates to centering gauges for accurately locating a workpiece with respect to a keyway cutter or the like.

One object of the invention is the provision of a gauge for relatively locating the work axis with respect to the cutter of a machine tool, the gauge incorporating diverging arms that rest on the workpiece and positioning means engageable with opposite sides of the cutter, with means for determining a predetermined relationship to a reference plane of the machine tool.

Another object is the provision of a centering gauge adapted for use in setting up a machine tool such as a milling machine or the like so that the keyway cutter or other tool will be enabled to cut a keyway that is truly radial and permitting the proper positioning of the work and the cutter with respect to one another merely by adjusting the work or the cutter until the gauge assumes a predetermined position.

Another object is the provision of a centering gauge of the character mentioned in which a positioning stop is adjustably mounted on a block that rests on the workpiece and cooperates with a locating finger movably arranged on the block, the stop and finger being movable towards and from a plane radial of the work and engageable with opposite sides of the cutter to be used on the work.

Other objects and advantages of the invention will be apparent from the following description, the appended claim, and the accompanying drawing, in which, Fig. 1 is a front elevation of a gauge embodying the present invention, shown in its application to a machine tool;

Figure 1:
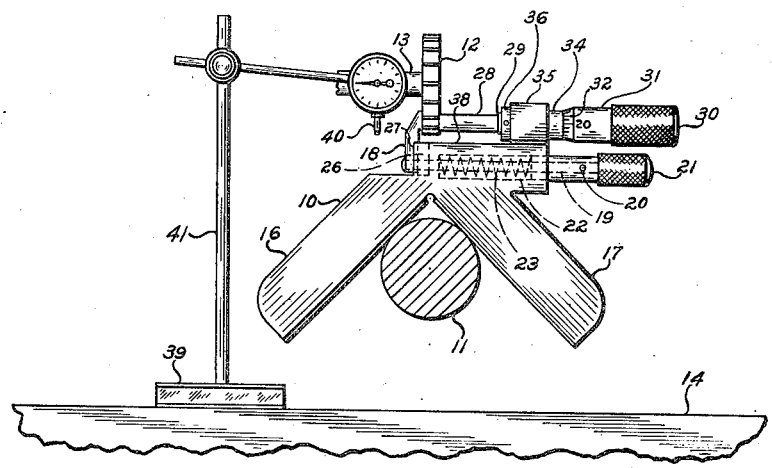
Figure 2:
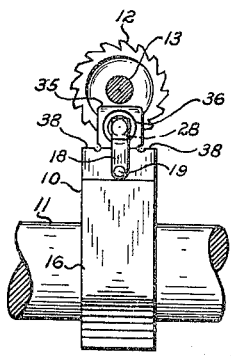
Fig. 2 is a side elevation of the gauge shown showing its relation to the workpiece and the cutter of a machine tool.

Referring more particularly to the drawing, in which the same reference numerals have been applied to like parts in the several views, 10 generally designates a block of steel or other suitable material forming the body portion of a gauge that may be used for relatively positioning an annular workpiece 11 and a cutter 12 in setting up a machine tool adapted to perform a grooving or keyway cutting operation on the work. As shown, the cutter takes the form of a rotatable milling tool arranged on a shaft 13 forming part of the milling machine. The workpiece 11 is an annular workpiece located in the machine tool centers and suitably held against rotation. The machine tool table 14 supports the work holding centers and may be raised or lowered and adjusted laterally in any desired manner with respect to the cutter shaft 13, as is customary in milling machines and the like, in order that the workpiece center may be properly located below the center of the tool. In accordance with the present invention the workpiece center may be exactly located below the center of the tool so that the keyway cut into the workpiece by the tool will be truly radial with respect to the workpiece without requiring intricate computations of workpiece size and extent of adjustments of the table 14.

Figure 4:
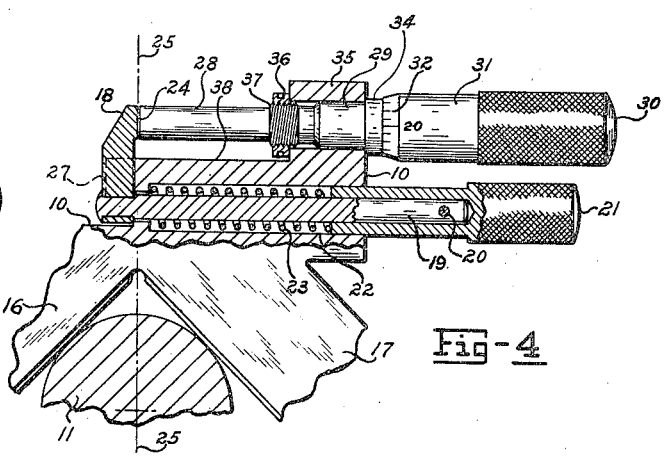
Fig. 4 is a fragmentary sectional view of a portion of the gauge body and illustrating the cutter engaging portions of the gauge.
Figure 3:
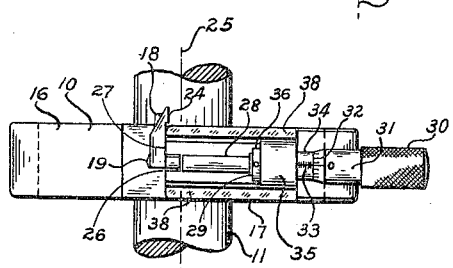
Fig. 3 is a top plan view of the gauge as it rests on the workpiece.

The block 10 is provided with two downwardly diverging arms 16 and 17 having suitable angular relationship such that these arms may rest on upper portions of the workpiece. Adjustably mounted in the block 10 is a locating finger 18 adapted to contact one side of the cutter 12. This finger is fixed to a rod 19 secured by pin 20 to a control knob 21 arranged for sliding and rotational adjustment in a cylindrical passage 22 in the block. A spring 23 arranged on the rod 19 yieldingly urges the rod towards the right as viewed in Fig. 4, holding the finger 18 in a normal position in which its cutter engaging face 24 lies in a plane designated by the line 25 which bisects the angle between the straight work engaging faces of arms 16 and 17. The lower portion of the finger 18 is received in a groove or channel 26 when the finger is in its normal position but when the control knob 21 is pushed to the left as viewed in Fig. 4 and turned, the finger 18 is pushed out of the channel 26 and turned so as to lie at 90 degrees from its normal position and contact with the surface 27 of the block, see Fig. 3. Thus it is displaced substantially from the plane 25.

Cooperating with the locating finger 18 is a positioning stop 28 shown in the form of the adjustable anvil of a micrometer 29. This anvil is fixed to the adjustment knob 30 of the micrometer and the latter is fixed to the barrel 31, having graduations 32, cooperating with a fixed index line 33 on the stationary holder 34 in which the anvil is threaded. The holder is secured in an upstanding projection 35 of the block 10 by means of a lock nut 36 engaging threads 37 on the holder. By turning the adjustment knob 30, the positioning stop 28 is axially adjusted as in the usual micrometer arrangement. The graduations 32 are such that a zero indication is shown when the positioning stop engages the locating finger 18 at the plane 25.

Assume that the axial length of the cutter 12 is one-quarter of an inch for cutting a one-quarter inch keyway in the workpiece. Under such conditions the adjustment knob 30 would be turned to move the positioning stop 28 one-eighth of an inch from its zero setting and thus one-eighth of an inch away from the plane 25 that bisects the angle between the diverging arms of the block. The locating finger 18 is pushed back and lowered to the position shown in Fig. 3. The work is then adjusted upwardly by raising the table 14 and moved laterally until the positioning stop 28 contacts the side of the cutter 12. The control knob 21 is then turned until the locating finger 18 is upright and the spring 23 thus yieldingly holds the locating finger against the other side of the cutting tool. The locating finger and the positioning stop are thus equidistant from the plane 25 and if the axis of the workpiece is exactly below the center of the cutting tool the plane 25 will be truly vertical so that when the gauge is removed the work can be adjusted upwardly and the groove or keyway cut in the workpiece will be truly radial. However, if the workpiece axis, as viewed in Fig. 1, is to the right or to the left of the position shown, then the whole block 10 will be tilted out of its normal proper position. In order that the proper predetermined position of the block on the workpiece can be readily determined with the geometric plane 25 exactly centered with respect to the cutter, the block is provided with leveling means, shown in the form of a flat finished reference surface 38 which has a known angular relationship to the geometric plane 25. The reference surface 38, as shown, is exactly 90 degrees from the plane 25 so that the reference surface should be exactly horizontal and parallel to the horizontal plane 14 when the block is properly positioned and when the work is centered below the center of the cutter. This parallel relationship of the surface 38 to the reference plane of the machine tool, namely the top of the table 14, may be determined by a surface gauge shown at 39 having a movable feeler 40 that may be travelled along the surface 38 by sliding the standard 41 of the surface gauge along the top of the table 14. If the same reading or indication obtains on the surface gauge as the latter is travelled along to the right as viewed in Fig. 1, in engagement with the reference surface 38, then the operator knows that the plane 25 of the block is exactly vertical and that the workpiece axis is exactly centered below the center of the cutter.

Thus the operator merely needs to know the size of the keyway to be cut, or in other words the axial length of the cutter, in order that he may properly position the micrometer stop 28. The spring 23 positions the locating finger which is thus held against the cutter and automatically positions the gauge on the work. The operator by moving the surface gauge 39 determines whether or not the surface 38 is horizontal, and if he finds that it is not he merely adjusts the workpiece axis laterally until it is. This makes unnecessary any of the laborious computations of workpiece diameters, etc., and any exact measurements of the amount of travel of a workpiece from some reference point in order that the keyway cut in the workpiece may be truly radial in direction.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

A centering gauge for centering the keyway cutter of a machine in a plane extending vertically upward from the axis of an annular workpiece, comprising a block having downwardly extending diverging arms free of any connection at their terminal ends and for resting on the workpiece, said block having a flat reference surface adapted to be brought into a predetermined exact relationship with a reference plane of the machine tool by relative axial adjustment of the cutter with respect to said plane, a positioning stop adjustably mounted on said block for movement towards a plane bisecting the angle between said arms, a micrometer adjustment for said stop and including means for indicating the position of the stop with respect to said bisecting plane, a rod carried in said block for rocking movement about its own axis and for axial movement towards and from said bisecting plane, a handle connected to one end of said rod for rocking the rod and for moving the rod axially, a locating finger fixed to an end of said rod and operable into and out of a position in which a portion of the finger is aligned with said stop, spring means operable to yieldingly hold the finger towards said stop and against the sides of cutters of different widths to be used on the workpiece for holding the cutter and the stop in yielding engagement with one another irrespective of the position of adjustment within the range of adjustment of the stop on the block so that axial adjustment of the cutter causes the block to rock on the workpiece.

WALTER BLESI.

REFERENCES CITED

The following references are of record in the file of this patent:

UNITED STATES PATENTS

| Number | Name | Date |
|---|---|---|
| 455,644 | Sloane | July 7, 1891 |
| 517,073 | Sloane | Mar. 27, 1894 |
| 1,486,667 | Jerman | Mar. 11, 1924 |
| 1,794,162 | Flamm | Feb. 24, 1931 |
| 2,379,406 | Alvis | July 3, 1945 |

FOREIGN PATENTS

| Number | Country | Date |
|---|---|---|
| 549,504 | Great Britain | Nov. 24, 1942 |